United States Patent [19]

Steward

[11] Patent Number: 5,451,414
[45] Date of Patent: Sep. 19, 1995

[54] MICRONUTRIENT SUPPLEMENT

[75] Inventor: Frederick A. Steward, Pittsburgh, Pa.

[73] Assignee: Heritage Environmental Services, Inc., Indianapolis, Ind.

[21] Appl. No.: 214,804

[22] Filed: Mar. 15, 1994

[51] Int. Cl.$^6$ .............................................. A23L 1/29
[52] U.S. Cl. ...................................... 426/74; 426/648
[58] Field of Search ................................... 426/74, 648

[56] References Cited

U.S. PATENT DOCUMENTS

| | | | |
|---|---|---|---|
| 2,295,643 | 9/1942 | Emery et al. | 426/74 |
| 2,760,866 | 8/1956 | Wielsen | 426/74 |
| 4,292,281 | 9/1981 | Chilcote et al. | |
| 4,948,594 | 8/1990 | Abdel-Monem et al | 426/74 |
| 4,956,188 | 9/1990 | Anderson | 426/74 |
| 5,114,592 | 5/1992 | Schuster et al. | |

FOREIGN PATENT DOCUMENTS 975568 10/1975 Canada .

OTHER PUBLICATIONS

Wagemann, R., *Some Theoretical Aspects of Stability and Solubility of Inorganic Arsenic in the Freshwater Environment*, Water Research, vol. 12, pp. 139–145 (1978).
Zivkovic et al., *Physical and Chemical Characteristics of Copperoxychlorid Obtained by Various Deposit Processes from Copper (II) Chlorid Solution*, Copper Institute, Yugoslavia, May 20, 1984.
Gaur, Vinod Kumar et al., *Residues of Copper Oxychloride and Copper Sulphate in Mung*, Indian Phytopathology, vol. 43, pp. 579–580 (1990).
Listing for Copper Oxychloride; 1992 Farm Chemicals Handbook.
*Atacamite;* Dana's System of Minerology; pp. 69–72.

*Primary Examiner*—Helen Pratt
*Attorney, Agent, or Firm*—Barnes & Thornburg

[57] ABSTRACT

The present invention relatess to a food product comprising a nutrient blend and a specified source of bioavailable copper. The present invention further relates to such a food product that is substantially free of soluble salts.

3 Claims, 1 Drawing Sheet

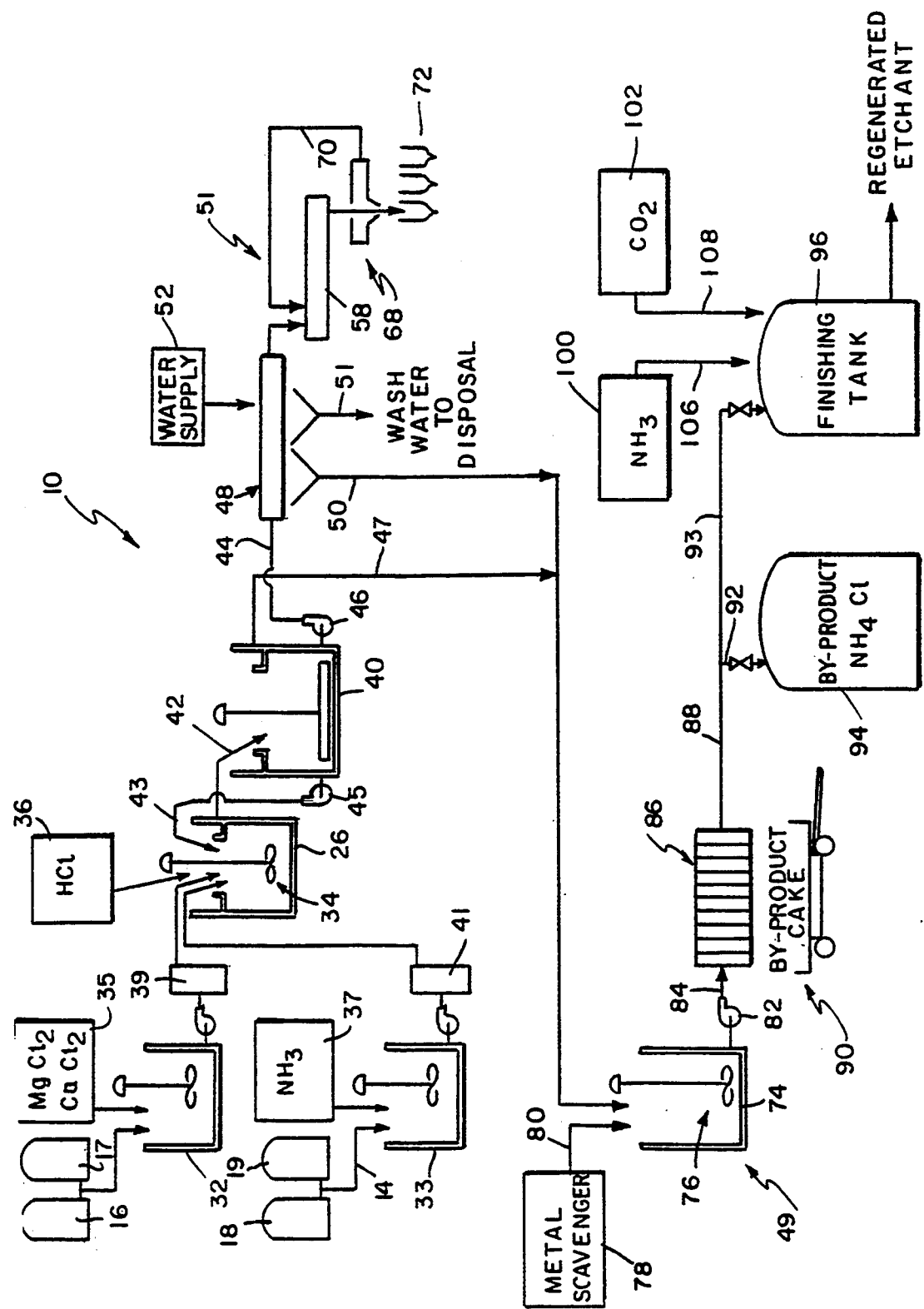

MICRONUTRIENT SUPPLEMENT

BACKGROUND AND SUMMARY

The present invention relates to mineral micronutrient supplements for food products, and to systems and processes for their production. More particularly, the present invention relates to food products incorporating basic copper chloride as a mineral supplement, and to systems and processes for producing such supplements.

Mineral sources, when used at levels consistent with good feeding practices, are important dietary supplements. The need for copper, for example, in poultry and livestock is critical. W. Mertz (Ed.) Trace Elements in Human and Animal Nutrition. Vol I. pp. 301-364 Academic Press, New York (1987). Copper deficiency is a major problem in cattle. Copper tends to form insoluble complexes with molybdenum and sulfide in a cow's rumen, where pH is about 6.0. These complexes remain insoluble through subsequent digestion, even though the pH drops to about 2.5. Thus, there is a need to provide copper supplements in animal feeds where the copper is present in a form in which insoluble complexes cannot form.

A number of copper sources have been approved for use in animal feeds, including, for example, copper sulfate and copper oxide. But current copper sources suffer from a variety of problems. Copper oxide has been shown to have low bioavailability. Copper sulfate, which has adequate bioavailability, often causes instability of desirable organic constituents in a feed mix. Labile nutrients such as vitamins and antibiotics are typically highly susceptible to oxidation. In fact, the dominant destabilizing effect on vitamins in feed mixes is redox reactions by trace minerals. Because copper sulfate has a particularly high water solubility, and because some moisture is inevitably present in feed mixes, copper sulfate tends to create a higher redox potential in the feed mix and release copper ions to catalyze oxidation of vitamins, antibiotics, or other nutrients.

Furthermore, in manufacturing copper-based micronutrient additives for feed products, controlling the particle size of the additive may present problems. Small particle size is generally desirable because small particles can be more easily blended with feed to create a finished feed mix having a relatively uniform distribution of micronutrient additive. However, if particles are too small, a dusting problem is created at the point of blending the additive with the feed, adding manufacturing costs.

With the presence of small particles it is also exceedingly difficult (in some cases nearly impossible) to rinse away the undesirable background constituents from the mother liquor during manufacture of the additive. For example, in manufacturing copper sulfate, the crystallization process is generally operated to produce relatively large crystals to allow free sulfuric acid and other impurities from the mother liquor to be rinsed off more completely. To produce smaller particles for blending into a feed mix, either the copper sulfate crystallization has to be run at suboptimal conditions, or the product has to be ground after formation. This, too, adds manufacturing costs.

The presence of background salts can be exceedingly problematic. For example, ammonium-based background salts may contribute to poor physical characteristics of the micronutrient additive, complicating handling and blending operations. Such salts are typically strongly hygroscopic, and tend to agglomerate when exposed to humid conditions, resulting in the formation of a hydrated, pasty product which is difficult to dewater and to break into a useful powdery material. Moreover, such salts can be highly astringent, which may lead to a reduction in feed intake.

The presence of contaminants in the copper source itself can also be exceedingly problematic. For example, low-cost copper sources often contain contaminants such as arsenic, which complicate separation operations. Furthermore, such a difficult separation operation may significantly increase production costs.

Thus, there is a need to provide a copper-based micronutrient additive which is compatible with vitamins and other nutrients or antibiotics likely to be present in the feed mix, which exhibits excellent bioavailability, and which also has an appropriate particle size.

According to the present invention, a food product is provided. The food product comprising a nutrient blend and, as a source of bioavailable copper, a compound of the formula $Cu(OH)_xCl_{(2-x)}$. Compounds of this general formula have been referred to as "basic copper chloride." Advantageously, basic copper chloride has low redox potential due to low water solubility, and has high bioavailability.

In accordance with a further aspect of the present invention, a process is provided for producing basic copper chloride from a copper source and a source of chloride ions. The process comprises the steps of retaining a predetermined amount of pre-formed basic copper chloride in a reactor and reacting the copper source and the source of chloride ions in the reactor in the presence of the preformed basic copper chloride. In one preferred embodiment, a soluble chloride salt of copper provides both the copper source and the source of chloride ions.

Advantageously, basic copper chloride produced by this process possesses good blending and handling characteristics. The basic copper chloride is produced as a free-flowing powder which can readily be blended into feed mixes for good micronutrient distribution, and which can also be readily blended into fertilizer mixtures. However, the particle size of the basic copper chloride produced by the present process is actually larger than that obtained by the use of previous processes. Background salts can be more easily removed from these larger particles.

In accordance with yet a further aspect of the present invention, a process is provided in which spent etchant streams (e.g., from an operation for manufacturing printed circuit boards) are regenerated to yield basic copper chloride and water-white, reusable ammonium chloride liquor which can be converted into etchant by additional processing. The process comprises the steps of reacting a spent alkaline etchant stream with an acidifying agent at a pH of about 1.8 to about 8.0 to form a product mixture including a copper-containing slurry and an ammonium chloride liquor containing dissolved copper, separating the copper-containing slurry from the ammonium chloride liquor, and contacting the ammonium chloride liquor with a metal scavenger to remove dissolved copper from the ammonium chloride liquor. In one preferred aspect of the process, the acidifying agent is a spent cupric etchant stream.

Advantageously, this process in its preferred embodiments makes use of waste material—preferably a spent cupric etchant stream and a spent alkaline etchant stream—to form a copper-containing slurry from which, for example, basic copper chloride can be recovered. Further advantageously, this process, through the controlled growth of particles, overcomes previous difficulties in removing ammonium chloride, a background salt, from the copper-containing slurry, enabling basic copper chloride to be recovered from the slurry for use as a micronutrient supplement or as a copper source in other products, including fertilizers.

In accordance with yet a further aspect of the present invention, a fertilizer product is provided which comprises a fertilizer blend and a compound of the formula $Cu(OH)_xCl_{2-x}$, wherein x is greater than 0 and less than or equal to 2.0.

Additional objects, features, and advantages of the invention will become apparent to those skilled in the art upon consideration of the following detailed description of preferred embodiments exemplifying the best mode of carrying out the invention as presently perceived by the inventor.

BRIEF DESCRIPTION OF THE DRAWINGS

The detailed description particularly refers to the accompanying FIG. 1 showing a flowsheet of a process and system for producing basic copper chloride from spent etchant solution.

DETAILED DESCRIPTION OF THE INVENTION

The present invention relates to food products and other products, including fertilizers, which make use of basic copper chloride as a copper source. The invention also relates to systems and processes useful for producing basic copper chloride regardless of whether the basic copper chloride is ultimately used as a micronutrient supplement, as an additive to fertilizer, or as an additive for other products. The systems and processes preferably make use of spent etchant streams as feedstocks, thus disposing of such streams in an environmentally sound manner while at the same time producing a useful product.

As used herein, "food product" encompasses both agricultural products (conventionally referred to as "feed") as well as food products for human consumption. "Nutrient blend" as used herein encompasses customary sources of nutrition in food products, including but not limited to carbohydrates, proteins, fats, and the like. "Fertilizer blend" as used herein encompasses the customary components of fertilizers for use on agricultural crops, such components typically including nitrogen, phosphorus, potassium and trace elements such as zinc, manganese, and copper.

"Basic copper chloride," as used herein, refers to a homologous series of compounds of the general formula $Cu(OH)_xCl_{2-x}$ where x is greater than 0 but less than 2.0. More preferably, x is greater than or equal to about 0.5 but less than or equal to about 1.5. Thus, basic copper chlorides are partially neutralized copper salts of hydrochloric acid. Basic copper chlorides generally have pH's ranging from about 1.9 to about 8.0, although the correlation between pH and speciation may vary somewhat depending upon the ionic matrix from which the compounds are formed. Individual members in the homologous series differ only in ratios of hydroxide and chloride and in the possible inclusion of water of crystallization. It is believed that the basic copper chloride produced with the processes and systems of the present invention is predominantly di-copper chloride trihydroxide (i.e., $x=1.5$).

Basic copper chloride occurs naturally as the mineral atacamite. The stability of atacamite is evidenced by its ability to endure dynamic regimes in its natural geologic environment. Atacamite is found as a secondary mineral in oxidation zones of ore deposits in various parts of the world. It is also found as an alteration product of ancient copper and bronze artifacts.

Basic copper chloride can be produced by a carefully controlled neutralization of either an acidic or an alkaline stream of soluble copper. For production via the acidic pathway, cupric chloride is typically used as the acidic copper source and may be neutralized with a wide variety of available bases, such as lime, caustic soda, ammonia, or other bases.

For production of basic copper chloride by the alkaline pathway, basic copper chloride may be precipitated from cuprammine chloride neutralized by HCl or other available acidic solutions. This reaction is as follows:

More preferably, both the acidic copper source and the alkaline copper source are combined under mildly acidic conditions, one neutralizing the other, to produce more product per unit volume of resultant solution. Such a self-neutralization reaction using a cupric chloride solution as the acidic copper source and a cuprammine solution as the alkaline copper source is as follows:

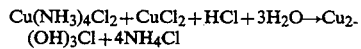

Soluble copper feedstocks for use in these reactions may be derived from a wide variety of sources. Substantially pure elemental copper or scrap copper (such as copper foil from which printed circuit boards are manufactured) may be used. Such copper could be dissolved in an ammonia-based alkaline solution as follows:

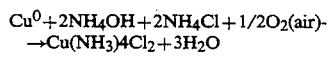

However, more preferably, waste copper streams from various manufacturing processes may be used. Copper "mud" from wire manufacturing (comprised primarily of elemental copper, copper oxide dust, and lubricant) may be used. More preferably, significant volumes of copper solutions, acidic and alkaline etchant solutions, are discharged from printed circuit board etching operations and can be used as feedstocks in the present process.

Etchant solutions are well known and are commercially available in the printed circuit board manufacturing industry. At one time, acidic etchants were widely used. For example, chlorine gas has been fed directly into a copper-containing etching bath, yielding a cupric chloride etchant solution. Smaller installations have used hydrochloric acid and an oxidizing agent such as sodium chlorate or hydrogen peroxide to form very low pH cupric chloride etching solutions.

Alkaline etchant solutions are more common today. Proprietary solutions made up predominantly of ammonium chloride and ammonium hydroxide are typically used. For example, ETCHANT ET1401 (formerly Alympic Max Etch 20 Starter) and ETCHANT ET1402 (formerly Alympic Max Etch 20 Replenisher) sold by Dexter Electronic Materials Division may be used as a fresh etchant precursor for the present processes and systems.

Fresh etchant solutions such as these eventually become saturated with copper after multiple etching operations. Spent etchant solutions are either discarded or are shipped back to the supplier for regeneration. Such spent solutions contain high levels of copper and may contain a variety of contaminants introduced during the etching operation. Arsenic, lead, and tin, for example, may be present in spent etchant solutions.

Etchant solutions are conventionally regenerated by either a boil-off process or by liquid ion exchange. In the boil-off process, caustic soda is added to the spent etchant and the mixture is heated to the boiling point to drive ammonia out as a gas. The ammonia is re-adsorbed in hydrochloric acid, resulting in the formation of "fresh" ammonium chloride and ammonium hydroxide for reuse as etchant. Copper is recovered from the process as cupric oxide, which can be sold. A waste brine of sodium chloride must be treated to remove copper and thereafter discharged. High energy and chemical consumption drive up operating costs in this process.

In the liquid ion exchange process, an ion exchange polymer dissolved in an organic liquid such as kerosene is contacted with the spent etchant solution. Copper is extracted into the organic phase, which subsequently is contacted with sulfuric acid to form copper sulfate and to regenerate the ion exchange polymer. The aqueous phase can be recycled as fresh etchant. However, this process involves high capital costs, and does not adequately deal with contaminants in the spent etchant solution. Moreover, some carryover of the organic phase into the aqueous phase is likely to occur.

A system 10 for producing basic copper chloride in accordance with the claimed invention is illustrated in FIG. 1. A first feed stream 12 is a spent copper-containing alkaline etchant solution (such as a cuprammine solution), and a second feed stream 14 is a spent copper-containing acidic etchant solution (such as a cupric chloride solution). Sets of plural storage tanks 16, 17, and 18, 19 may be provided for the etchant feedstocks. Advantageously, the system can be operated to produce basic copper chloride by either the alkaline pathway in which a spent alkaline feedstock is neutralized by HCl or by self-neutralization of spent acidic and alkaline etchant solutions. With minor modifications, system 10 could be used to produce basic copper chloride by either neutralizing the alkaline etchant with HCl or by neutralizing the acidic etchant with a convenient alkaline agent such as lime.

Typically, quality assurance procedures will be performed before the etchant feedstock is pumped from the storage tanks. When one of tanks 16, 17 (or 18, 19) is filled with a new batch of etchant feedstock, that tank is closed off and inputs to the process come from the other tank. The new etchant solution in the closed tank is then checked for appearance, acidity/alkalinity, organic content, copper and trace metallic impurities, and specific gravity. The contents of the tank are then homogenized before the tank is brought on-line.

Alkaline feed stream 12 is fed at a controlled rate into the process. For example, stream 12 may be pumped from tanks 16, 17 by a metering pump (not shown) or the like. Where stream 12 contains high levels of soluble arsenic (e.g., 20 mg/l or more), it can be treated in a pretreatment reactor 32 before being fed to the primary reactor.

A variety of techniques may be used to convert substantial amounts of soluble arsenic to insoluble forms in pretreatment reactor 32. Most preferably, at least one calcium compound and at least one magnesium compound (e.g., magnesium chloride and calcium chloride from a source 35) are added to pretreatment reactor 32 to precipitate arsenic in the form of low solubility calcium magnesium arsenates. Precipitation should be complete in less than one hour. Stream 12 may then be filtered using standard filtration equipment 39 to remove the precipitate. Through use of this method, spent alkaline etchant containing 20 mg/l soluble arsenic can be treated to reduce soluble arsenic levels to less than 1.0 mg/l.

When system 10 is operated to produce basic copper chloride by the self-neutralization pathway, a spent copper-containing acidic etchant feedstock is mixed with alkaline feed stream 12. Acidic feed stream 14 is fed at a controlled rate into the process (for example, by being pumped from storage tanks 18, 19 by a metering pump or the like). Where stream 14 is a spent acidic etchant stream contaminated with arsenic, pretreatment in a pretreatment reactor 33 may again be necessary. Here, the preferred pretreatment method involves pH control. It is speculated that when the pH is raised, relatively insoluble complex arsenates are formed.

In the preferred method of pretreating stream 14 to reduce levels of soluble arsenic, the pH of stream 14 is raised to the point where precipitation begins to occur, and the precipitate is filtered out using standard filtration equipment 41. Alkaline stream 12, or another alkaline source (such as ammonia from a source 37), may preferably be used to raise the pH. By use of this pretreatment method, arsenic levels in stream 14 can be reduced from about 20 ppm to about 6.0 ppm.

For operation of system 10 via the alkaline pathway, copper-containing alkaline etchant stream 12 is pumped to primary reactor 26 after optionally being treated as described to remove arsenic. Hydrochloric acid (or any other suitable neutralizing agent) from a source 36 is pumped directly to reactor 26 in an amount effective to maintain the pH of the reaction mixture within a predetermined range as set forth below.

Reactor 26 includes a standard agitator 34. Because the reaction in reactor 26 is run at ambient conditions and is only mildly exothermic, no special provisions for heat input, heat removal, or high pressure need be made. The reaction mixture in reactor 26 is preferably maintained at a pH of about 1.8 to about 8.0. More preferably, the pH of the reaction mixture is about 4.0 to about 5.0. Most preferably, the pH is about 4.5. Redundant pH controllers (not shown) of any well-known variety are provided and are routinely calibrated to assure carefully-monitored pH conditions.

Residence times may vary. Although the reaction is nearly instantaneous, it may be preferable to use an oversized reactor to provide as much as an eight hour residence time to give a strong buffering effect. However, it is believed that residence times as low as about five minutes may be effective.

The reaction products (basic copper chloride and soluble background salts) are pumped from reactor 26 to a settler 40 by way of a line 42. Settler 40 separates the reaction products from reactor 26 into a supernatant brine and a copper-containing slurry. The brine is comprised primarily of ammonium chloride liquor and dissolved copper, while the slurry is comprised of basic copper chloride along with a variety of background salts.

A predetermined portion of the copper-containing slurry is withdrawn for use as a seed stream for "seeding" the crystallization of basic copper chloride in reactor 26. The "seed" material is pumped through a seed line 43 by a pump 45 from settler 40 to the bottom of primary reactor 26.

The use of a seed stream provides numerous advantages. The presence of "seed" product appears to facilitate the growth of basic copper chloride crystals. Seeding also allows control over final product particle size. That is, seeding may be used to produce relatively large particles which can be more readily separated from background salts, but not so large as to create problems in blending the basic copper chloride with food products. The desired particle size is in the range of 30–300 microns.

It is important to maintain an appropriate concentration of seed slurry in the reactor. This parameter will be controlled by withdrawing a sample and checking the "seed index" (settled volume of slurry in the reactor after five minutes) periodically. For example, the "seed index" for reactor 26 may range from about 15 to about 50% under typical processing conditions, although it may range higher or lower under certain processing conditions.

The supernatant brine from settler 40, an ammonium chloride liquor, passes directly to a finishing operation 49 by way of a line 47. The remaining portion of the slurry from settler 40 not used as seed material is pumped by a pump 46 though a line 44 to a drying operation 51.

Drying operation 51 includes a filter 48, a dryer 58, and a sieve 68. Filter 48 is preferably a standard vacuum filter familiar to those of skill in the art. A water wash from a water supply 52 is provided to assist in removing ammonium chloride from the solids, with the effluent wash water 54 being sent to disposal. Filter 48 operates to remove excess liquid from the slurry, yielding a substantially dry filter cake. The excess liquid flows through line 50 for further treatment in finishing operation 49 as will be subsequently described.

When the filter cake is substantially free of ammonium chloride, the filter cake is discharged to a final dryer 58. Dryer 58 is typically supplied with an external heat source. An automatic sieve 68 positioned downstream of dryer 58 is used to monitor the size of dewatered filter cake fractions emerging from dryer 58. Appropriately sized fractions pass through sieve 68 and are transported to a packaging operation where they are packaged for sale in bags 72 or the like for use as a micronutrient supplement or for use as a copper source in a fertilizer product. Oversized and undersized fractions are forced into a recycle line 70 to be returned to dryer 58.

Advantageously, the basic copper chloride product made in accordance with the present process is a fine powder which can readily be blended with food products using standard blending techniques and equipment (not shown). The product is substantially free of background salts and contaminants such as arsenic. The product combines the desirable characteristics of high bioavailability with very low water solubility. Thus, when blended into food products as a micronutrient supplement, basic copper chloride produced in accordance with the present process will be highly effective in achieving desired nutritional levels and will be less likely than current micronutrient supplements to destabilize vitamins and antibiotics in the food product.

Basic copper chloride produced in accordance with this process is also usable in other applications requiring copper sources where copper sulfate, copper oxide, or other copper salts are presently used. For example, the basic copper chloride may be blended into a fertilizer.

As noted, supernatant ammonium chloride liquor from settler 40 (in line 47) and ammonium chloride liquor recovered from product filter 48 (in line 50) are fed to polishing operation 49. Polishing operation includes a polishing reactor 74 and a filter press 86.

Polishing reactor 74 (preferably an agitated tank reactor including an agitator 76) receives and treats mixed ammonium chloride liquor from lines 47 and 50. A metal scavenger 78 such as dimethyl dithiocarbamate (sold under the tradename NAMET (Buckman Laboratories, Memphis, Tenn.)) is fed to polishing reactor 74 by way of line 80 in an amount sufficient to substantially reduce levels of dissolved copper and other metals. For example, ammonium chloride liquor containing 500–1000 mg/l dissolved copper can be treated to yield an effluent containing less than about 5.0 mg/l dissolved copper.

The effluent liquor from polishing reactor 74 is pumped by a pump 82 through a line 84 to reach filter press 86. Filter press 86 is preferably a standard filter press operated in the conventional fashion.

The liquor in line 84 is fed through press 86 to yield a "water-white" ammonium chloride liquor (which is discharged into a line 88) and a substantially dried by-product cake (which is dumped from by-product press 86 to a by product container 90. The by-product cake is primarily dimethyldithiocarbamate and copper which can be processed by a copper smelter for recovery of copper values.

The clear ammonium chloride liquor in line 88 can be finished into fresh etchant or can be sold itself. Preferably, about 30% by volume of the ammonium chloride liquor is split off into a line 92 to be stored in a storage vessel 94. Ammonium chloride liquor from tank 94 may be sold for use in a variety of manufacturing processes, including the manufacture of galvanizing flux or dry-cell batteries.

The remaining 70% by volume of clear ammonium chloride liquor is fed to a finishing tank 96 by means of a line 93. Anhydrous ammonia 100 and carbon dioxide 102 are supplied to finishing tank 96 by way of lines 106, 108 in amounts sufficient to finish the ammonium chloride liquor into regenerated alkaline etchant solution.

Processes in accordance with the present invention are preferably operated semi-continuously. That is, holding tanks 16, 17 and 18, 19 of incoming spent etchant solution will be filled, analyzed, and run through the process as a batch. Primary reactor 26, however, will be run continuously to maintain uniform operating conditions. Filter 48 and dryer 58 will operate continuously, although batchwise operation of both is also possible.

The system and process in accordance with the present invention may be further understood with reference to the following examples.

EXAMPLE I

Basic copper chloride was produced in accordance with the process of the present invention in a 500 gallon pilot reactor. The sources of soluble copper were spent etching solution (acidic and alkaline) from a printed circuit board manufacturer. The basic copper chloride produced by this process was a fine, light-green powder which was extensively tested for stability and trace impurity levels. The basic copper chloride produced in accordance with this example has the following specifications:

| Element | (mg/kg) |
|---|---|
| Copper | 589400 |
| Chloride | 167700 |
| Nitrogen | <5000 |
| Aluminum | 9.2 |
| Antimony | 100 |
| Arsenic | 43.7 |
| Cadmium | 0.05 |
| Lead | 1.8 |
| Mercury | 0.02 |
| Nickel | 1.8 |
| Zinc | 77.3 |

Thermal stability of the product was evaluated by use of thermogravimetric analysis (TGA). This analysis showed that the product was thermally stable in air to about 400° C.

EXAMPLE II

An experiment was conducted to compare the bioavailability of copper from basic copper chloride with that of reagent grade cupric sulfate (CuSO4.5H2O). A basal corn-soybean diet containing 26 ppm copper (dry matter basis) by analysis was formulated. The copper sources were added to the basal diet at 150, 300, and 450 ppm copper and confirmed by analysis. A total of 288 one-day-old Ross x Ross chicks was used in the 21-day experiment. There were six pens of six chicks (three male and three female) fed the basal diet and seven pens of six chicks fed each copper-supplemented diet. Birds were housed in Petersime brooder batteries with stainless steel fittings and maintained on a 24 hr constant light schedule. Tap water containing no detectable copper and feed were available ad libitum. At the end of the experiment, the birds were sacrificed and livers were collected. Copper concentrations in feed, water, livers, and copper sources were determined by flame temperature atomic absorption spectrophotometry on a Model 5000 with an AS-50 autosampler after dry ashing and solubilizing the ash in HCl.

Chicks fed 450 ppm copper as copper sulfate had lower (P <0.05) feed intakes than those fed basic copper chloride or the basal diet at all dietary concentrations. Moreover, estimates of relative bioavailability of basic copper chloride ranged from 90% to 106% compared with 100% for copper sulfate. Thus, the detrimental effect of copper sulfate on feed intake was not observed with basic copper chloride, yet the bioavailability of basic copper chloride was equal to that of copper sulfate.

Furthermore, a strong inter-species correlation is recognized in bioavailability of copper from poorly-available sources such as cupric carbonate and cupric oxide when compared with cupric sulfate and cupric acetate. This suggests high bioavailability for basic copper chloride in other species as well.

EXAMPLE III

A standard feed mix supplemented with basic copper chloride had the specifications shown in the table below. In the table, the "microingredients" were supplied per kilogram of diet. The microingredients included 6000 IU vitamin A, 2200 ICU vitamin $D_3$, 2.2 mg menadione dimethylpyrimidinol bisulfite, 500 mg choline chloride, 4.4 mg riboflavin, 13.2 mg pantothenic acid, 39.6 mg niacin, 22 $\mu$g vitamin $B_{12}$, 125 mg ethoxyquin, 60 mg manganese, 50 mg iron, 6 mg copper, 1.1 mg iodine, 35 mg zinc and 100 $\mu$g selenium. Vitamin E and pyridoxine are added separately at a concentration to provide 5 IU and 3 mg, respectively to each kg of diet.

Further, the "dicalcium phosphate" included 22% Ca and 18 5P. In addition, the "variables" included a copper source and washed builder's sand in appropriate concentrations to furnish the desired final dietary copper concentration.

| | Percentage In Diet | |
|---|---|---|
| INGREDIENTS | Starter | Grower |
| Yellow corn | 57.28 | 63.50 |
| Soybean meal (48.5% CP) | 33.87 | 28.43 |
| Microingredients | .50 | .50 |
| Corn oil | 3.80 | 3.34 |
| Ground limestone | 1.05 | 1.25 |
| Dicalcium phosphate | 2.35 | 1.90 |
| DL-Methionine | .18 | .11 |
| Iodized salt | .40 | .40 |
| Coban | .07 | .07 |
| Variables | .50 | .50 |
| TOTAL | 100.00 | 100.00 |
| Calculated Analysis | | |
| Crude protein (%) | 21.50 | 19.50 |
| ME (kcal/kg) | 3103.00 | 3138.00 |
| Lysine (%) | 1.21 | 1.05 |
| Methionine + Cysteine (%) | .87 | .75 |
| Calcium (%) | .92 | .90 |
| Phosphorus (% available) | .55 | .55 |

EXAMPLE IV A fertilizer product containing basic copper chloride typically falls within the following specification:

| | |
|---|---|
| Total Nitrogen | 30% |
| 3.0% Amm. Nitrogen | |
| 27.0% Urea Nitrogen | |
| Available Phosphoric acid ($P_2O_5$) | 10% |
| Soluble Potash ($K_2O$) | 10% |
| Boron (B) | 0.02% |
| Copper (Cu) | 0.07% |
| Iron (Fe) | 0.325% |
| Manganese (Mn) | 0.19% |
| Molybdenum (Mo) | 0.005% |
| Zinc (Zn) | 0.07% |

Although the invention has been described in detail with reference to certain preferred embodiments, variations and modifications exist within the scope and spirit of the invention as described and defined in the following claims.

I claim:

1. A food product comprising a nutrient blend and, as a source of bioavailable copper, a compound of the formula $Cu(OH)_xCl_{(2-x)}$, wherein x is greater than 0 and less than or equal to 2.0.

2. The food product of claim 1, wherein x is about 1.5.

3. The food product of claim 1 substantially free of soluble salts.

* * * * *